(12) United States Patent
Becea et al.

(10) Patent No.: US 11,609,541 B2
(45) Date of Patent: *Mar. 21, 2023

(54) SYSTEM AND METHOD OF IOT DEVICE CONTROL USING AUGMENTED REALITY

(71) Applicant: ARRIS Enterprises LLC, Suwanee, GA (US)

(72) Inventors: Adrian Becea, Carlsbad Springs (CA); Ganesh Nagarajan, Bangalore (IN); Stephen E. Strand, Blacksburg, VA (US); Charles Ross Denneler, Lawrence, KS (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,409

(22) Filed: Aug. 31, 2021

(65) Prior Publication Data

US 2021/0397150 A1 Dec. 23, 2021

Related U.S. Application Data

(63) Continuation of application No. 15/834,037, filed on Dec. 6, 2017, now Pat. No. 11,131,973.

(51) Int. Cl.
*G05B 19/042* (2006.01)
*G06F 16/951* (2019.01)
(Continued)

(52) U.S. Cl.
CPC ........ *G05B 19/042* (2013.01); *G06F 16/951* (2019.01); *H04L 67/025* (2013.01);
(Continued)

(58) Field of Classification Search
CPC ........ G05B 19/042; G05B 2219/23298; G06F 16/951; H04L 67/025; H04L 67/141; H04L 67/303; G06T 19/006; H04W 4/70
See application file for complete search history.

(56) References Cited

U.S. PATENT DOCUMENTS

9,940,752 B2 4/2018 Tommy
10,110,678 B2 10/2018 Hebsur
(Continued)

*Primary Examiner* — Santosh R Poudel
(74) *Attorney, Agent, or Firm* — Wenderoth, Lind & Ponack, L.L.P.

(57) ABSTRACT

A method and system for remotely controlling an external device includes storing, in a computing device, a plurality of device profiles, each device profile including connection data, one or more control commands, and at least one associated image; receiving, by an imaging device interfaced with the computing device, a live rendering of a physical environment; detecting, by the computing device, a registered image in the live rendering of the physical environment; identifying, in the computing device, a specific device profile where the at least one associated image includes the detected registered image; establishing, by the computing device, a communication channel with an external device using the connection data included in the identified specific device profile; and electronically transmitting, by the computing device, at least one of the one or more control commands included in the identified specific device profile to the external device using the established communication channel.

19 Claims, 5 Drawing Sheets

(51) Int. Cl.
  *H04L 67/025* (2022.01)
  *G06T 19/00* (2011.01)
  *H04L 67/141* (2022.01)
  *H04L 67/303* (2022.01)
  *H04W 4/70* (2018.01)

(52) U.S. Cl.
  CPC .. *G05B 2219/23298* (2013.01); *G06T 19/006* (2013.01); *H04L 67/141* (2013.01); *H04L 67/303* (2013.01); *H04W 4/70* (2018.02)

(56) References Cited

U.S. PATENT DOCUMENTS

| | | |
|---|---|---|
| 10,149,110 B2 | 12/2018 | Cao |
| 2010/0311347 A1 | 12/2010 | D'Ennequin |
| 2012/0105447 A1 | 5/2012 | Kim |
| 2012/0268286 A1 | 10/2012 | Jin |
| 2013/0187953 A1 | 7/2013 | Matsumura |
| 2015/0019714 A1 | 1/2015 | Shaashua |
| 2015/0058740 A1 | 2/2015 | Asahi |
| 2015/0130957 A1 | 5/2015 | Berelejis |
| 2015/0363640 A1 | 12/2015 | Meyer |
| 2016/0021692 A1 | 1/2016 | Saito |
| 2016/0149716 A1 | 5/2016 | Raj |
| 2016/0330412 A1 | 11/2016 | Scalisi |
| 2017/0105190 A1 | 4/2017 | Logan |
| 2017/0132841 A1 | 5/2017 | Morrison |
| 2017/0134553 A1 | 5/2017 | Jeon |
| 2017/0163438 A1 | 6/2017 | Gary, Jr. |
| 2017/0185276 A1 | 6/2017 | Lee |
| 2017/0195424 A1 | 7/2017 | Nasir |
| 2017/0222884 A1 | 8/2017 | Denneler et al. |
| 2017/0287321 A1 * | 10/2017 | An .................. H04N 21/41265 |
| 2018/0019929 A1 | 1/2018 | Chen |
| 2018/0278431 A1 | 9/2018 | Yoon |
| 2019/0121522 A1 | 4/2019 | Davis |

\* cited by examiner

FIG. 5

SYSTEM AND METHOD OF IOT DEVICE CONTROL USING AUGMENTED REALITY

FIELD

The present disclosure relates to the remote control of an external device via an augmented reality interface, specifically the display of a live rendering of an environment where external devices may be selectable for control through an augmented reality interface interacting with the live rendering to provide for more convenient and intuitive access to digital devices.

BACKGROUND

As technology develops and improves, more and more devices are created that are network-enabled in one manner or another, enabling the user to control or otherwise access the device remotely through a separate computing device. These network-enabled devices are often referred to as part of the "internet of things." Examples of traditional types of digital devices that have begun to be adopted into the internet of things or are otherwise network-enabled include thermostats, doorbells, automobiles, refrigerators, light switches, door locks, and garage doors. Such devices are able to connect to a local area network provided by the device owner, or in some cases an alternative network that may provide access to the internet, such as a cellular communication network, where the device owner may be able to interact with the device via an application program executed on their own computing device or a web page.

The control of such devices for a user using their own computing device can offer a level of convenience, for instance, enabling the user to adjust the temperature in their house even while away from their house thanks to the internet connectivity. However, because each device might require the use of its own specialized application program or webpage, as a user purchases more and more internet of things devices, it begins to be inconvenient and time consuming to discover the digital devices to be managed, identify their capabilities, locate the proper application program associated therewith, and adjust settings and controls for every single device that needs to be managed. Furthermore, it may become difficult for the user to remember which application program corresponds to which device, or to identify the proper application program for a device, particularly if the device is one not interacted with often by the user.

Thus, there is a need for a technical solution to provide for greater convenience and intuitive interaction with internet of things devices by a user without the use of application programs and web pages that scale with the number of devices being controlled.

SUMMARY

The present disclosure provides a description of systems and methods for remotely controlling an external device. A user utilizes a computing device that is configured to connect to each internet of things device that the user wishes to be controlled. The computing device is able to capture a live rendering of the user's environment, such as through a camera located on the device, and enable the user to register images in the live rendering via an augmented reality interface that can be associated with each internet of things device. At subsequent times when the user, via the augmented reality interface, captures a live rendering of their environment that includes a registered image, the registered image is detected and enables the user to control, in the same application program that provides the augmented reality interface, the associated device. As a result, the user can control any and all devices via a single application program and interface, and select the devices through an intuitive interface or by simply pointing the camera at the device, such as by directly touching the device in the augmented reality interface, providing for easier selection of devices than traditional methods of hunting through a list of installed application programs and remembering which program corresponds to which internet of things device.

A method for remotely controlling an external device includes: storing, in a computing device, a plurality of device profiles, wherein each device profile includes connection data, one or more control commands, and at least one associated image; receiving, by an imaging device interfaced with the computing device, a live rendering of a physical environment; detecting, by the computing device, a registered image in the live rendering of the physical environment; identifying, in the computing device, a specific device profile of the plurality of device profiles where the at least one associated image includes the detected registered image; establishing, by the computing device, a communication channel with an external device using the connection data included in the identified specific device profile; and electronically transmitting, by the computing device, at least one of the one or more control commands included in the identified specific device profile to the external device using the established communication channel.

A system for remotely controlling an external device includes: a device database of computing device configured to store a plurality of device profiles, wherein each device profile includes connection data, one or more control commands, and at least one associated image; an imaging device interfaced with the computing device configured to receive a live rendering of a physical environment; a detection module of the computing device configured to detect a registered image in the live rendering of the physical environment; a querying module of the computing device configured to execute a query on the device database to identify a specific device profile of the plurality of device profiles where the at least one associated image includes the detected registered image; a communications interface of the computing device configured to establish a communication channel with an external device using the connection data included in the identified specific device profile; and a transmitting device of the computing device configured to electronically transmit at least one of the one or more control commands included in the identified specific device profile to the external device using the established communication channel.

A non-transitory computer readable media has instructions operable to cause one or more processors to perform the operations including: storing, in a computing device, a plurality of device profiles, wherein each device profile includes connection data, one or more control commands, and at least one associated image; receiving, by an imaging device interfaced with the computing device, a live rendering of a physical environment; detecting, by the computing device, a registered image in the live rendering of the physical environment; identifying, in the computing device, a specific device profile of the plurality of device profiles where the at least one associated image includes the detected registered image; establishing, by the computing device, a communication channel with an external device using the connection data included in the identified specific device profile; and electronically transmitting, by the computing device, at least one of the one or more control commands included in the identified specific device profile to the external device using the established communication channel.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Remote Control of External Devices Via Augmented Reality

Figure 1:
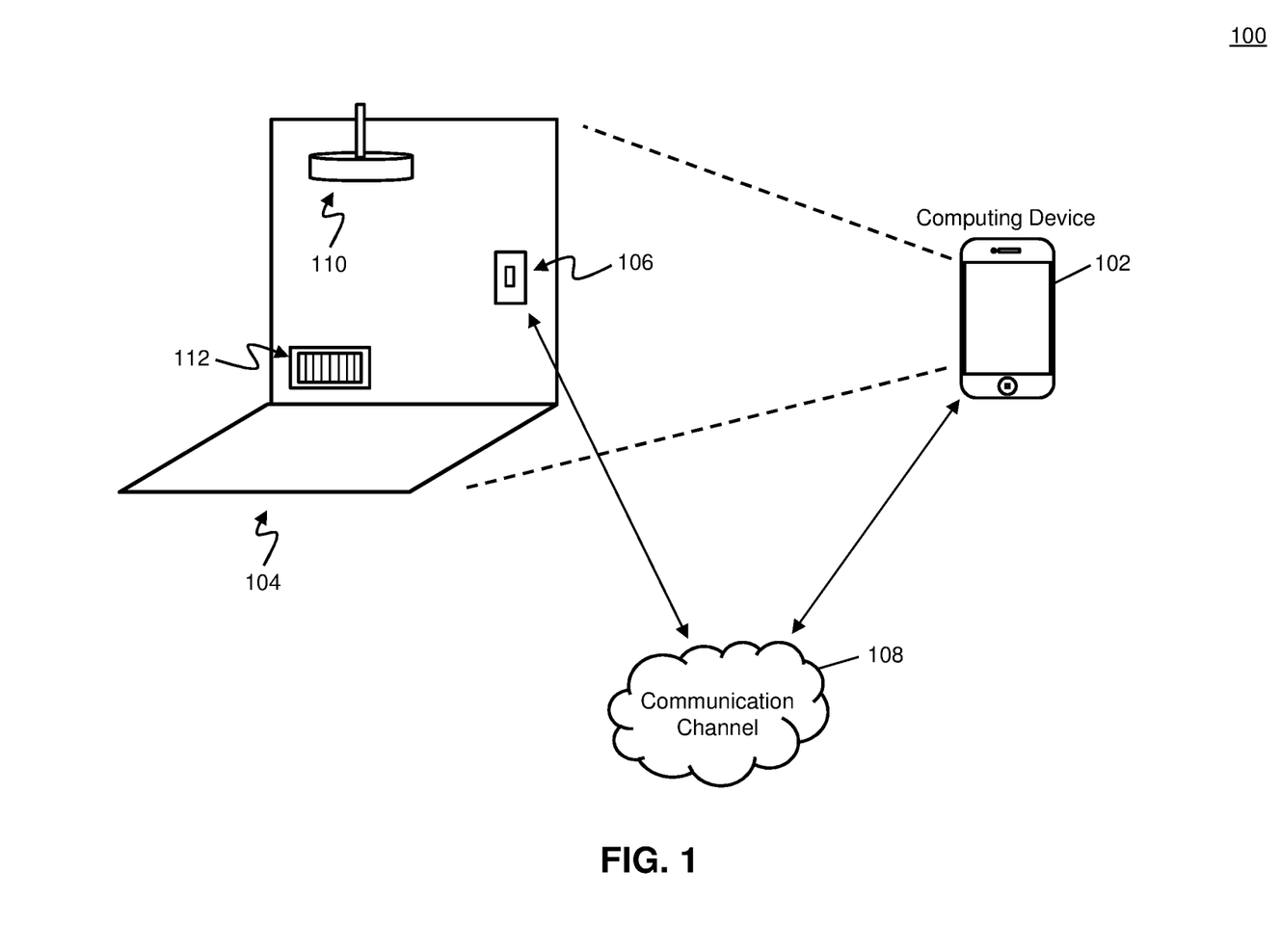
FIG. 1 is a block diagram illustrating a high level system architecture for remotely controlling an external device via an augmented reality interface in accordance with exemplary embodiments.

FIG. 1 illustrates a system 100 for the remote control of internet of things devices via the use of an augmented reality interface to provide a user control of various internet of things devices through a single application program via a series of registered images.

The system 100 may include a computing device 102. The computing device 102, discussed in more detail below, may be a device accessible by a user that may be configured to capture a live rendering of a physical environment 104 to display an augmented reality interface in relation thereto to enable the user to remotely control one or more internet of things devices, illustrated in FIG. 1 as devices 106, 110, and 112. The computing device 102 may be any type of computing device configured to capture a live rendering of a physical environment 104 and provide an interface to the user thereof for performing the functions discussed herein, such as a specifically configured cellular phone, smart phone, smart watch, wearable computing device, implantable computing device, desktop computer, notebook computer, tablet computer, smart television, augmented reality glasses, etc. The computing device 102 may include at least a camera or other type of optical imaging device configured to capture a live rendering of the physical environment 104.

In some cases, the live rendering may be such that, as the user moves the computing device 102, the live rendering may update based on the movement of the computing device 102, such as to display new portions of the physical environment 104 captured by the computing device 102. For instance, the live rendering may be an image capture of the physical environment 104 based on what may be captured by a camera of the computing device 102, where the image updates based on the movement of the camera of the computing device 102.

The user may utilize the computing device 102 to control one or more of the external devices through images of the physical environment 104 as detected in the live rendering presented on the computing device 102. In the system 100, the computing device 102 may detect potential internet of things devices that may be controlled by the computing device 102. In an exemplary embodiment, a single application program executed by the computing device 102 may be configured to capture and display the live rendering of the physical environment 104 and detect and control external devices as discussed herein. Such devices may be controlled either directly by the computing device 102 or via one or more intermediate devices. For instance, one external device may be a light, where the light may be controlled directly by the computing device 102 or where the light may be controlled through a separate device (e.g., installed at the light switch) where the computing device 102 may communicate therewith. In some cases, the computing device 102 may detect all internet of things or other network-enabled devices connected to an area network to which the computing device 102 is connected. In some instances, the user of the computing device 102 may be able to manually add internet of things devices for control via the computing device 102, such as through dedicated application programs, web page interfaces, application programming interfaces, etc. In some cases, the user may be presented with devices directly viewable in the live rendering of the physical environment 104, or in the direction which the computing device 102 is faced (e.g., would be viewable in live rendering beyond any walls, floors, or other impediments).

The user of the computing device 102 may register each external device they wish to control through the application program executed by the computing device 102. Registration of a device for remote control may include the selection of the external device as well as the capturing of one or more images in the live rendering of the physical environment to be associated with the external device. Selection of the external device may be performed in any suitable method. In one instance, the application program executed by the computing device 102 may display a list of all detected external devices, where the user may be able to select a specific external device from the list. In another instance, the application program may be configured to attempt to identify a detected external device in the live rendering of the physical environment 104, or in some cases in a captured image as selected by the user, such as using data associated with the external device and image recognition technology. In yet another instance, the user may manually add the external device to the application program, such as through its own associated application program, when registering the external device.

The one or more images may be captured in the application program via an augmented reality interface provided with the live rendering of the physical environment 104. The user may, via the augmented reality interface, select any or all of the currently displayed live rendering as the captured image to be associated with a specific external device. In an exemplary embodiment, any captured image may be able to be associated with an external device. For instance, in the example illustrated in FIG. 1, the physical environment, the user may wish to control a light 110. The user may capture an image of the light 110 itself in the live rendering of the physical environment 104 or may capture an image of a light switch 106 that is used to control the light 110. In some cases, the light switch 106 may be an internet of things device, which may be the selected external device that the user wishes to associate with the captured image. In another example illustrated in FIG. 1, the physical environment 104 where the user is located may include a vent 112. The user may capture an image of the vent 112 and associate it with a thermostat or other internet of things device that controls the climate or that the user otherwise associates with the vent, even if the device is located in a different portion of the environment, such as in a different room of a house. In some cases, the user may select a captured image that is not directly related to the external device they wish to control. For example, the user may capture an image of a movie poster on their wall, which they may associate with their refrigerator as the internet of things device to be controlled. In these cases, any image that may be captured of the live rendering of the physical environment 104 through the augmented reality interface may be associated with an external device for connection thereof. In some cases, the user may select multiple images for association with an external device, such as by capturing images of every vent and thermostat in a house for association with an internet-enabled climate control system.

The computing device 102 may register any captured image(s) with the selected external device. When the user wants to control a device, the user may access, in the computing device 102, a live rendering of their physical environment 104. The user may point the computing device 102 towards an object or area that the user associates with the device they wish to control, such that the live rendering captures that object or area. The computing device 102 may be configured to detect a previously registered image in the live rendering, corresponding to the object or area that the user associates with the device that was captured in the registration process. The detection of a previously registered image may be performed using any suitable image recognition method. In an exemplary embodiment, the computing device 102 may display, via the augmented reality interface, an indicator on the live rendering to indicate the detected, registered image. The indicator may be, for example, a green box that outlines or highlights the captured image. In cases where the registered image may be of the device itself or a specific object, the indicator may be an outline of the device or object. In some instances, the user may choose the indicator that may be used for a registered image, such as by selecting different shapes, colors, or symbols for the indicator for easier selection or recognition of the device to which a captured image corresponds.

The computing device 102 may detect the captured image, display the indicator to the user, and provide the user with the ability to remotely control the associated external device. For instance, in the example illustrated in FIG. 1, if the user navigates the computing device 102 to capture a live rendering of the physical environment 104 that includes the light switch 106, the computing device 102 may detect the light switch 106 and enable the user to control the light 110. In cases where a live rendering may include multiple captured images, the augmented reality interface may display an indicator for each detected, registered image, where the user may select (e.g., by tapping on the augmented reality interface on the desired indicator, selecting from a list of detected images, etc.) one of the associated devices for control. In some cases, the selection may be performed by simply pointing the computing device 102 toward a registered image or object. For example, the computing device 102 may display a crosshair that the user could aim toward the detected image. In instances where no registered image is detected in the live rendering, selection of an area or object by the user may initiate the registration process to register a new image (e.g., of the selected area or object) for association with an external device.

When an external device is to be controlled, the computing device 102 may establish a communication channel 108 with the external device. The communication channel 108 may utilize the Internet or any other suitable method of communication with the external device, such as via an alternative communication network such as the area network, Bluetooth, Zigbee, radio frequency, near field communication, etc. In some cases, multiple types of networks may be utilized in establishing the communication channel 108. For instance, the computing device 102 may first establish communication with the external device via the internet, but may then connect directly to the external device via the area network, such as after first receiving connection data via the internet. The computing device 102 may utilize any protocols or standards in communicating with the external device as may be associated therewith, which may vary from one external device to another. In such cases, the computing device 102 may identify such data for communication when detecting the external device or when the external device is registered for control. In some instances, the application program used by the user may receive the communication data from a secondary application program on the computing device 102, such as one that may be directly associated with the respective external device. In some embodiments, the computing device 102 may be configured to display messages or notifications to the user thereof regarding the establishing of the communication channel 108. For instance, the computing device 102 may display a confirmation message if the connection is successfully established with the target external device, or may display an error message if the communication channel 108 is not establish. In some such instances, error messages may be accompanied by options for selection by the user to retry the connection or to adjust settings (e.g., authentication information that may be required by the external device). In some cases, such messages or notifications may be displayed on the live rendering. For instance, in one example, the indicator that indicates the detected image may reflect the connection status, such as a box outlining the detected image being initially gray, but turning green if the communication channel 108 is successfully established or turning red if the communication channel 108 is unsuccessful.

In one embodiment, the computing device 102 may establish the communication channel 108 directly to the external device via the application program that provides the augmented reality interface for selection of the external device. In another embodiment, the application program that provides the augmented reality interface, referred to herein as the "primary" application program may communicate with the external device through an application program directly associated with that external device, referred to herein as the "secondary" application program. For instance, the primary application program may be the augmented reality application program, whereas the secondary application program may be an application program that is provided by the manufacturer of the external device for control thereof. In such cases, the primary application may utilize an application programming interface of the secondary application program where the user may be able to modify control of the external device via the primary application program, but where the controls are transmitted to the external device via the communication channel 108 as established with the secondary application program.

Using the established communication channel 108, the user of the computing device 102 may be able to control the external device that is associated with the detected, registered image in the live rendering of the physical environment 104. Control of the external device may include the issuing of one or more instructions that are configured to modify operation of the external device in one manner or another, where such operations may be dependent on the type and capabilities of the external device. For instance, a light switch may be turned on, off, or the illumination level modified, while a thermostat may be used to turn on or off heat or air conditioning, change temperatures, etc. Such instructions may be input via any suitable method, such as voice, gesture (e.g., directly on the computing device 102 or viewable thereby, such as via a camera), direct input, movement of the computing device 102 itself, etc. For example, the user may point the computing device 102 at a light switch, where the computing device 102 will detect the light switch and identify the device associated therewith, and then say "on" to have the associated light turn on. In some embodiments, the user instructions for control may be transmitted directly from the primary application program to the external device via the communication channel 108. In other embodiments, the user instructions for control may be transmitted from the primary application program to the secondary application program, which may forward the instructions to the external device via the communication channel 108. The external device may receive the instructions and may modify operation accordingly. In some embodiments, the computing device 102 may be configured to display information regarding the submission of instructions to the external device, such as status information regarding the success or failure of the external device to receive and/or implement the instructions. For instance, the computing device 102 may display a confirmation message or error message if the external device succeeds or fails, respectively, at implementing the instructions submitted by the user.

In some embodiments, the computing device 102 may be configured to recommend device control options for the user. Such device control options may be based on past selections of the user, registered user preferences, options identified via artificial intelligence, selections of other users of the primary application program for the same device or similar devices, current device settings, etc. For example, if the device is a thermostat the computing device 102 may recommend that the temperature be set to a preferred temperature of the user, and/or may base a temperature recommendation on outside conditions. Additionally, the computing device 102 may be configured to provide other recommendations, such as for management of the external device. For instance, if the computing device 102 detects that the power level of the device is low, the computing device my recommend that a battery be replaced or the device recharged. In some embodiments, the user may define, or the computing device 102 may suggest based on past actions of the user, a series of device control options to execute. For example, a chain of actions may be set by the user to be performed when the user enters their house, such as to adjust temperature, turn on lights, and turn on music.

In some cases, such a chain of actions may be initiated by detecting an image associated with one device involved in the chain of actions, or by detecting an image directly associated with the chain of actions.

In some instances, the application program may display an interface for control of an external device directly on the live rendering, such as via the augmented reality interface which may overlay or obscure the live rendering. For example, a portion of the screen used to display the live rendering may be dedicated to displaying controls that may be used by the user for the associated external device. In another instance, an interface may be displayed on the indicated captured image that the user may interact with to modify control of the external device. For example, if the associated external device is a thermostat, a virtual representation of the thermostat or the thermostat's interface may be displayed via the augmented reality interface on the captured image. In yet another instance, when an external device is selected for control via the detected, registered image, the primary application program may be configured to launch an instance of the secondary application program to enable the user to control the external device therefrom. In another instance, the primary application program may be configured to display an instance of the secondary application program as an overlay on the augmented reality interface, such as simulating control of the external device via the secondary application program on the detected image. In some cases, the computing device 102 may display contextual controls that are specific to the type of control and/or its values. For instance, Boolean values may be control via an on/off switch, checkbox, or other similar input type, while a control with a range of possible values may be controlled via a slider with directional buttons that may be grayed out or hidden if the value reaches a corresponding end of the range, where the slider may also be accompanied by a display of the corresponding value.

In some embodiments, the computing device 102 may be configured to display data regarding the current and/or adjusted control settings of the external device, as well as any additional settings or characteristics that may be useful to the user of the computing device 102. For instance, if the external device is a light, the computing device 102 may display a status indicator that indicates the current status of the light (e.g., on, off, current intensity level, etc.). In such an instance, the computing device 102 may be configured to update the display following the issuing of control instructions by the user. For example, if the light is initially off, but is turned on by the user using the methods discussed herein, the computing device 102 may update the display to reflect the light being turned on. In another example, the external device may be a thermostat, which, as discussed above, may be controlled through a registered image of a vent as opposed to the thermostat itself. In order to assist the user in controlling the thermostat, the computing device 102 may display (e.g., accompanying the detected image, overlaid on the detected image, etc.) current status and settings data of the thermostat, such as the current temperature, desired temperature, heating/cooling schedules, etc. As with the light switch, the computing device 102 may update such a display when the settings of the device are adjusted by the user. In some cases, the computing device 102 may register itself with the external device (e.g., or secondary application associated with the external device) to receive updated status and settings information, which may be received as part of the established communication channel 108 or received separately based on the capabilities and configuration of the external device, such as through push notifications pushed the computing device 102. In some instances, the computing device 102 may poll the external device or secondary application for updated settings and status information, which may be performed when the communication channel 108 is established, at a predetermined interval when the communication channel 108 is operable, once the communication channel 108 is closed, at a predetermined interval (e.g., which may be different than the above-referenced interval) when no direct communication channel 108 is established, etc. In these instances, such updated settings and status information may be reflected in the display of the computing device 102 for the external device, if applicable.

In some embodiments, the computing device 102 may be configured to provide a live rendering of a simulated or virtual representation of the physical environment 104 through which the user may be able to select external devices for control as an alternative to the real-world environment to which it corresponds. For instance, the computing device 102 may, as live renderings of a real-world environment are captured, generate a spatial representation of the physical environment 104, the detected images, and the detected devices. In such embodiments, the user of the computing device 102 may use the simulated representation (e.g., via virtual reality) of the physical environment 104 to detect captured images and control external devices. For example, the user may, while physically in the physical environment 104, register the vent 112 in the physical environment 104 to control their thermostat in their house. Then, the user may be at work but desire to control their home thermostat, where, in such a case, the computing device 102 may display a virtual representation of the physical environment 104 where the user may navigate in the virtual representation to locate the vent 112, where the computing device 102 may detect the captured image associated therewith and provide the user with an interface to control the thermostat. In such embodiments, the virtual or simulated representation of the physical environment 104 may be operated analogous to the user and computing device 102 being physically located in the real-world environment. As discussed herein, "physical environment" may thus refer to real-world environments as well as virtual or spatial representations of a real-world environment. Methods for the creation of a spatial representation of an area including the location of external devices for control can be found in U.S. patent application Ser. No. 15/419,455, entitled "Spatial Representation of Network Elements," by Charles Ross Denneler et al., filed on Jan. 30, 2017, which is herein incorporated by reference in its entirety.

Methods and systems discussed herein may enable a user to control a nearly unlimited number of internet of things devices via a single application program on a computing device 102 using an augmented reality interface on a physical environment 104 where the user may associate images captured in the physical environment 104 with the external devices. By using captured images and the live rendering of the physical environment 104, the user may control the external devices without having to remember which secondary application program is associated with which external device, as well as without having to go through one secondary application program after another, even the locating of which can be time consuming, when multiple devices are to be controlled. In addition, enabling the user to associate their own images with external devices may provide even further ease of use to users, by enabling users to customize how and from where they control their external devices. Thus, the system 100 provides a technical solution that has significant improvements over existing methods for controlling external devices that is faster, more convenient, and more intuitive for users.

Computing Device

Figure 2:
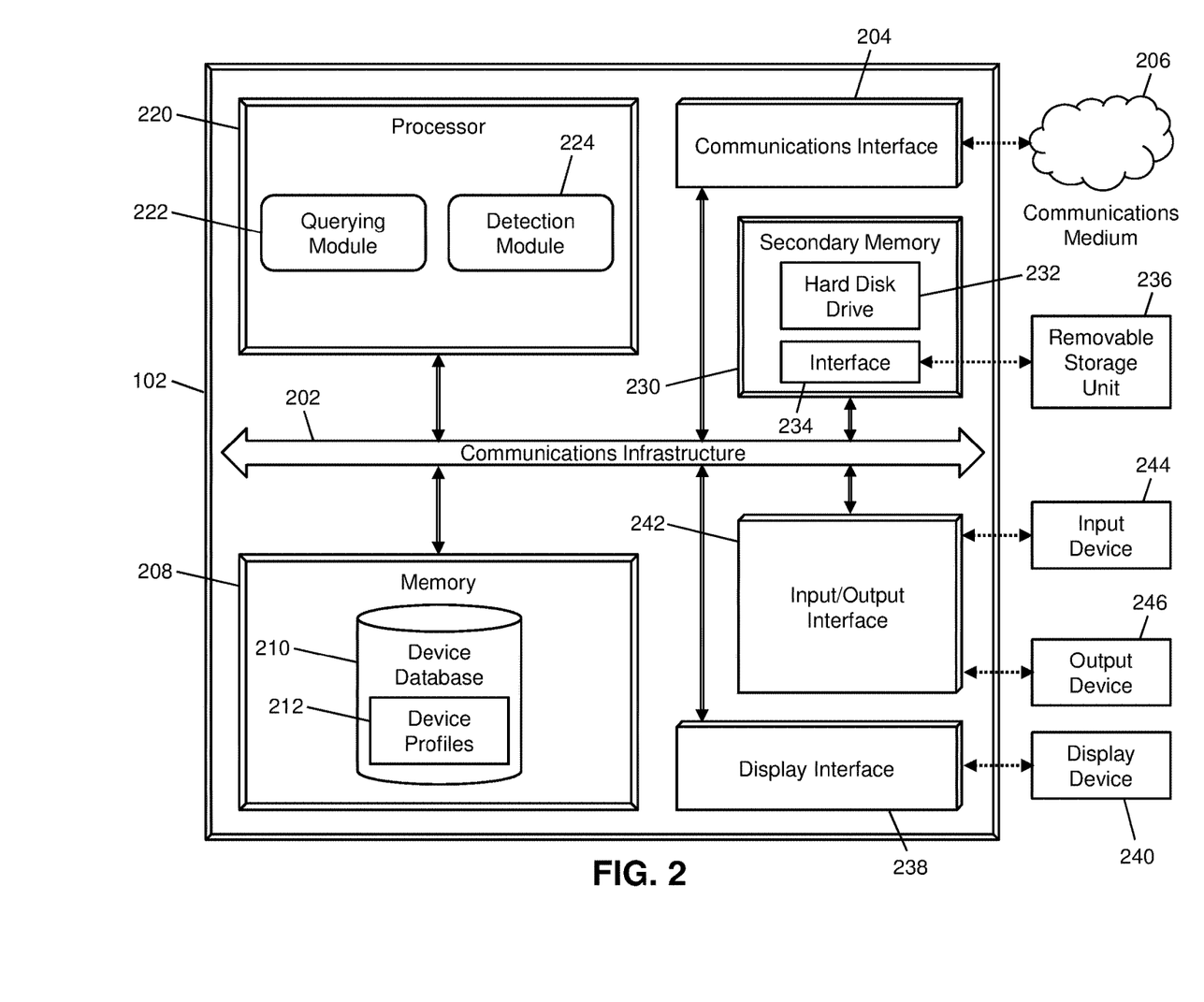
FIG. 2 is a block diagram illustrating the computing device of the system of FIG. 1 for remotely controlling external devices via augmented reality in accordance with exemplary embodiments.

FIG. 2 illustrates an embodiment of the computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein.

The computing device 102 may include a communications infrastructure 202. The communications infrastructure 202 may be configured to transmit data between modules, engines, databases, memories, and other components of the computing device 102 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computing device 102 and external components of the computing device 102, such as externally connected databases, display devices, input devices, etc.

The computing device 102 may also include a communications interface 204. The communications interface 204 may include one or more interfaces used to interact with and facilitate communications between the computing device 102 and one or more external devices via suitable communications mediums 206. For instance, the communications interface 204 may interface with the communications infrastructure 202 and provide an interface 204 for connecting the computing device 102 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the computing device 102 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein.

The communications interface 204 may be configured to establish communication channels 108 with external devices, such as the light switch 106 and light 110 illustrated in FIG. 1, via communication channels 108 established therewith. In some cases, the communications interface 204 may provide for the transmission of user instructions as controls to the external device from the primary application program. In other cases, the communications interface 204 may provide for the transmission of user instructions from the secondary application program, where the communications infrastructure 202 of the computing device 102 may facilitate communications between the primary and secondary application programs.

The computing device 102 may also include memory 208. The memory 208 may be configured to store data for use by the computing device 102 in order to perform the functions discussed herein. The memory 208 may be comprised of one or more types of memory using one or more suitable types of memory storage, such as random access memory, read-only memory, hard disk drives, solid state drives, magnetic tape storage, etc. In some cases, the memory 208 may be non-transitory computer readable media, which may be configured to store data suitable for execution by the computing device 102 in performing the functions discussed herein. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computing device 102 may include a device database 210. The device database 210 may be configured to store a plurality of device profiles 212 using a suitable storage format and schema. For example, the device database 210 may be a library of device profiles 212 or other types of data storage, such as may utilize a repository for the storage of device data. Each device profile 212 may be a structured data set configured to store data related to an external device that may be controlled via the methods discussed herein. Each device profile 212 may be configured to store, for instance, one or more captured images that have been associated with the related device during the registration process, communication data for establishing a communication channel 108 with the external device, data associated with communicating with the device's secondary application program, control settings or options, interface data for displaying an interface related to the control thereof, etc. The memory 208 may also be configured to store program data for application programs to be executed by a processor 220 of the computing device 102, such as program code for the first application program and any secondary application programs. In some embodiments, the memory 208 may also be configured to store spatial data for use in providing virtual or simulated representations of a physical environment 104. The memory 208 may also store algorithms for use in performing image recognition for detecting captured images in a live rendering of a physical environment 104 as discussed herein.

The computing device 102 may also include the processor 220. The processor 220 may be configured to perform the functions of the computing device 102 discussed herein as will be apparent to persons having skill in the relevant art. In some embodiments, the processor 220 may include and/or be comprised of a plurality of engines and/or modules specially configured to perform one or more functions of the processing device, such as a querying module 222, detection module 224, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the computing device 102 may include a querying module 222. The querying module 222 may be configured to execute queries on databases to identify information. The querying module 222 may receive one or more data values or query strings, and may execute a query string based thereon on an indicated database, such as the device database 210, to identify information stored therein. The querying module 222 may then output the identified information to an appropriate engine or module of the computing device 102 as necessary. The querying module 222 may, for example, execute a query on the device database 210 to identify a device profile 212 that includes a captured image that matches an area or object in a live rendering being captured of a physical environment 104, representative of the detection of that captured image in the physical environment 104.

The processor 220 of the computing device 102 may also include a detection module 224. The detection module 224 may be configured to detect captured images in live renderings of a physical environment 104, or, if applicable, in a simulated or virtual representation of a previously captured physical environment 104. The detection module 224 may be configured to utilize image recognition techniques and algorithms to detect an area or object in a live rendering of a physical environment 104 that has been previously captured. The detection module 224 may also be configured to detect external devices that may be eligible for control via the methods discussed herein, such as by monitoring for external devices located on an area network to which the computing device 102 is connected or by monitoring for transmissions from external devices that may be received via the communications interface 204. In some embodiments, the detection module 224 may also be configured to detect an external device in a live rendering of a physical environment 104 based on data associated with the external device, including image data, signal strength and/or direction, image recognition, etc.

In some embodiments, the computing device 102 may also include a secondary memory 230. The secondary memory 230 may be another memory in addition to the memory 208 that may be used to store additional data for use in performing the functions of the computing device 102 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computing device 102 may also include a display interface 238. The display interface may be configured to interface the computing device 102 with one or more display devices 240. The display devices 240 may be devices configured to display data received from the computing device 102. Display devices 240 may be any suitable type of display, including, for example, liquid crystal displays, light emitting diode displays, thin film transistor display, capacitive touch displays, etc. In some instances, the computing device 102 may include one or more display interfaces 238, which may interface with one or more display devices 240. Display devices 240 may, for example, display live renderings of a physical environment 104 being captured by the computing device 102, which may also include an augmented reality interface displayed thereon that may assist the user in capturing images for association with external devices, displaying indicators of detected, registered images, displaying lists of external devices for selection, displaying controls for an external device, displaying an interface for controlling an external device, etc. In some embodiments, the display device 240 may be configured to display a virtual or spatial representation of a physical environment 104 for use in performing the functions discussed herein.

The computing device 102 may also include an input/output interface 242. The input/output interface 242 may be configured to interface the computing device 102 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to an computing device 102, such as a keyboard, mouse, microphone, camera, light field camera, touch screen, click wheel, scroll wheel, remote control, accelerometer, compass, gyroscope, sensor, etc. Input devices 244 may be configured to receive input from a user of the computing device 102, such as for the selection of an area or object in a live rendering of a physical environment 104 for use as a captured image associated with an external device. Input devices 224 may also be used by the user to select an external device for association with a captured image or for the adding of an external device into the device database 210 for future control thereof. The input devices 224 may also be configured to receive user instructions for the control of an external device, such as may be transmitted thereto via a communication channel 108 for the control thereof. Output devices 246 may include any suitable type of device for outputting data from an computing device 102, such as a speaker, remote control, headset, tactile feedback device, etc.

Process for Registration of Images for Control of External Devices

Figure 3:
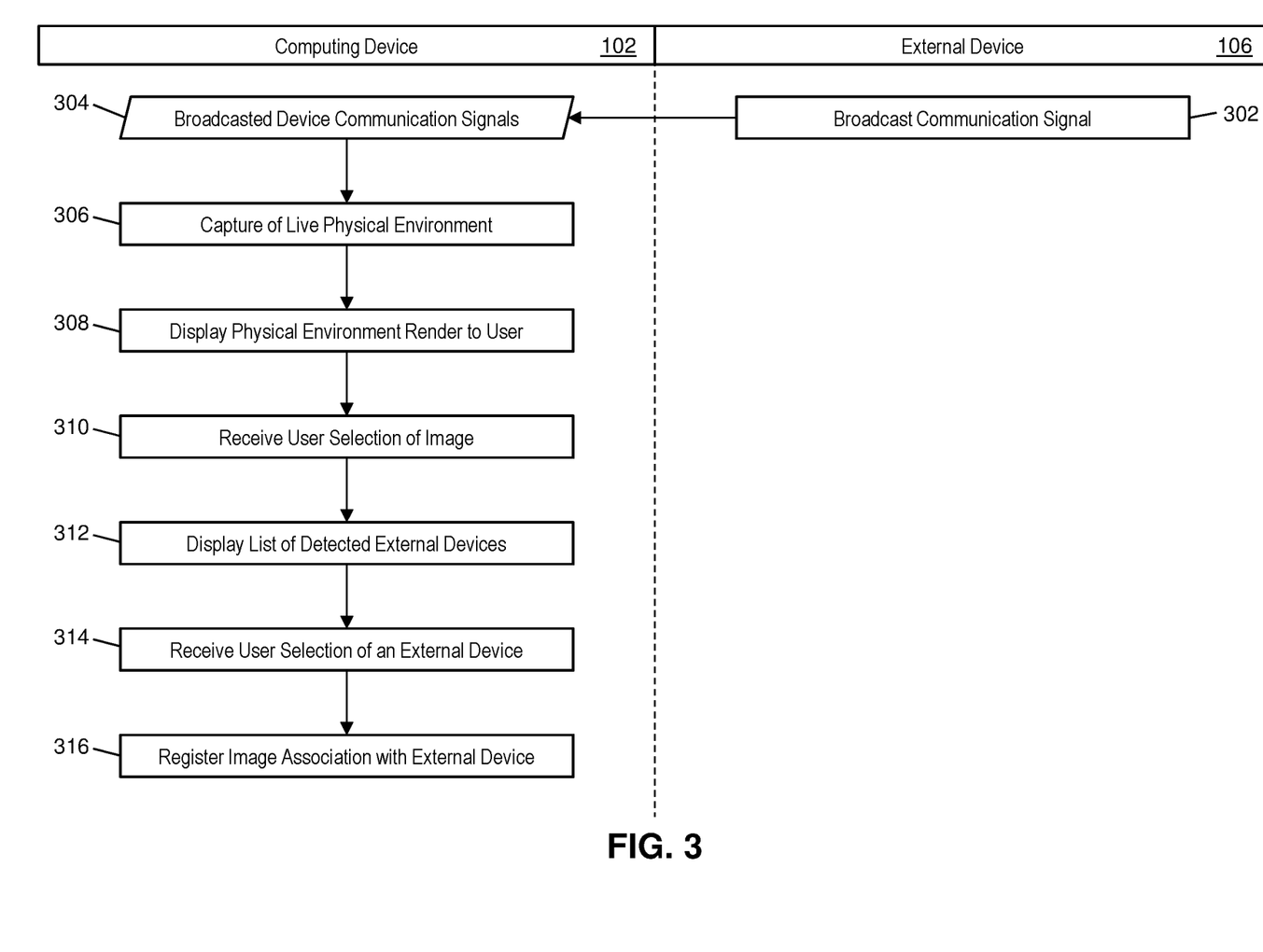
FIG. 3 is a flow diagram illustrating a process for the registration of external devices for control via an augmented reality interface in the system of FIG. 1 in accordance with exemplary embodiments.

FIG. 3 illustrates an example process in the system 100 for the registration of one or more captured images in a live rendering of a physical environment 104 to be associated with an external device for the control thereof using an augmented reality interface.

In step 302, an external device 106 may broadcast a communication signal that may be detected by other devices, such as the computing device 102. In some cases, the broadcast may be a signal emitted by the external device 106 through one or more communication networks. In other cases, the broadcast may be the connection of the external device 106 to a communication network where it may be discoverable by other devices. For instance, the broadcast of the external device 106 may be represented by its connection to an area network that includes the computing device 102. In step 304, a receiver of the communications interface 204 of the computing device 102 may receive the broadcasted signal of the external device 106 and thereby detect (e.g., via the detection module 224) that the external device 106 exists on the area network and is eligible for control.

In step 306, an input device 244 of the computing device 102 may capture a live rendering of a physical environment 104. In step 308, a display device 240 of the computing device 102 may display the live rendering of the physical environment 104 to a user of the computing device 102. In an exemplary embodiment, the live rendering of the physical environment 104 may update in real-time as the computing device 102 is moved or adjusted, such as based on movement of an optical imaging device (e.g., a camera) thereof. In embodiments where a virtual representation of the physical environment 104 is used, the virtual representation may be moved based on movement of the computing device 102, such as to simulate movement of the computing device 102 in the real physical environment 104.

In step 310, an input device 244 of the computing device 102 may receive an instruction from a user thereof selecting a portion of the live rendering. The selected portion of the live rendering may be captured by the computing device 102 to serve as a captured image that is to be associated with an external device, such as the external device 106. In some cases, the live rendering may be an image of the external device 106 or a component of the external device 106, or, in other cases, may have no direct relation to the external device 106. In step 312, the display device 240 of the computing device 102 may display a list of all external devices 106 detected by the computing device 102 that the user may select to associate with the captured image. In step 314, the input device 244 may receive input of the user's selection, selecting one of the external devices 106 for registration as being associated with the captured image. In step 316, the querying module 222 of the computing device 102 may execute a query on the device database 210 in the memory 208 of the computing device 102 to insert a new device profile 212 therein related to the selected external device 106 that includes the captured image and any data associated with the external device 106 for communication therewith and control thereof. In instances where a device profile 212 already exists for the external device 106 (e.g., an image has already been registered as associated with the external device 106), then the newly captured image may be added to the existing device profile 212.

Process for Remote Control of an External Device Via Augmented Reality

Figure 4:
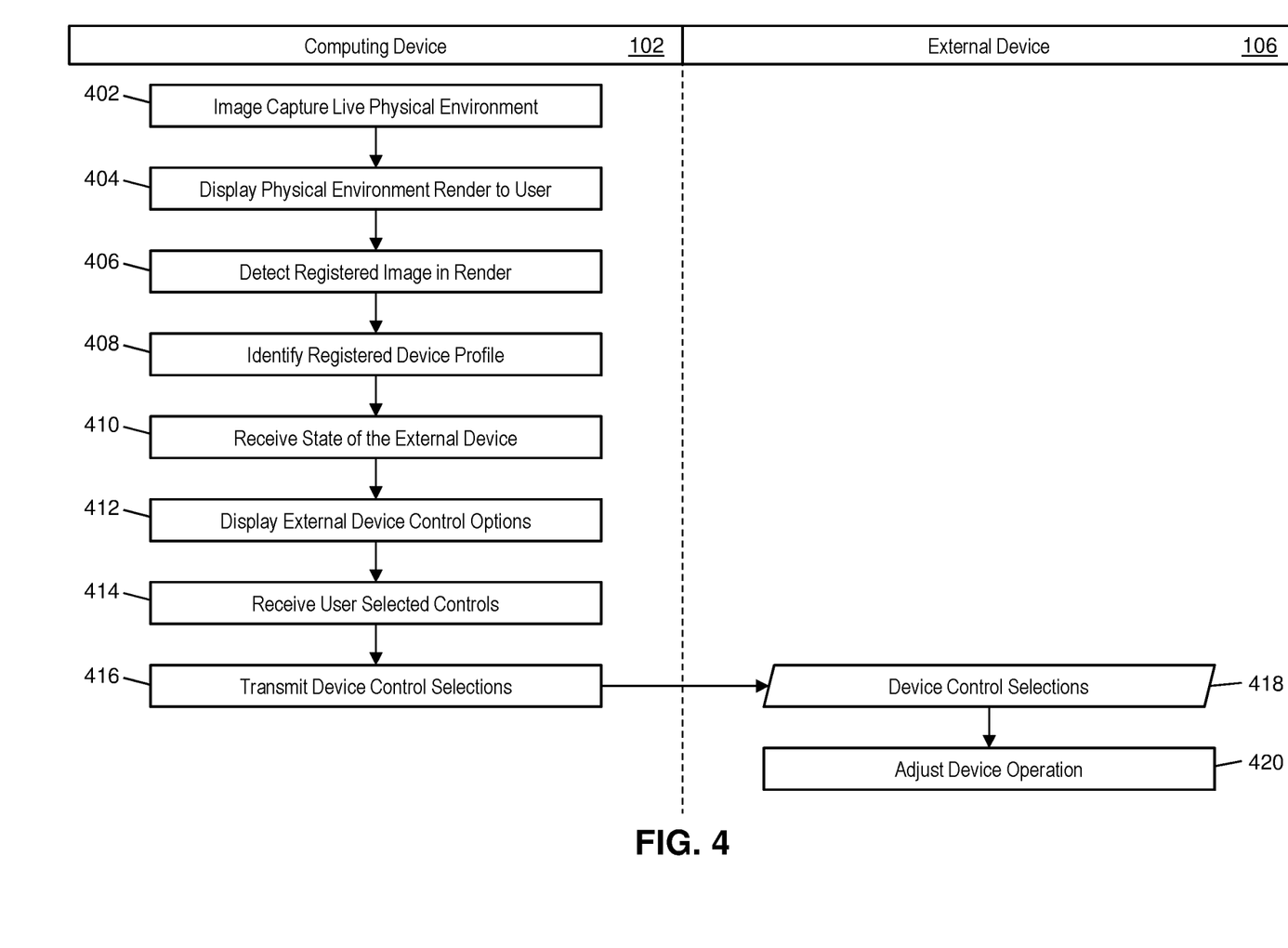
FIG. 4 is a flow diagram illustrating a process for the remote control of an external device through an augmented reality interface in the system of FIG. 1 in accordance with exemplary embodiments.

FIG. 4 illustrates an example process in the system 100 of FIG. 1 for the remote control of an external device, such as the light switch 106 or light 110 via the use of augmented reality in the computing device 102.

In step 402, an input device 244 of the computing device 102 may capture a live rendering of a physical environment 104 in which the computing device 102 is located, such as by using a camera mounted on or as part of the computing device 102. In step 404, the display device 240 of the computing device 102 may display the live rendering to a user of the computing device 102. In an exemplary embodiment, the live rendering may be updated in real-time as the computing device 102 is moved or orientation of the computing device 102 is changed. In step 406, the detection module 224 of the computing device 102 may use image recognition tools and algorithms to detect a registered image in the live rendering of the physical environment 104. In some cases, the detection module 224 will continually attempt to detect a registered image in the live rendering as the live rendering is updated in real-time, until such a time when an attempted detection is successful.

Once a registered image has been detected, then, in step 408, the querying module 222 of the computing device 102 may execute a query on the device database 210 of the memory 208 of the computing device 102 to identify a device profile 212 stored therein that includes the registered image that was detected by the detection module 224. Once the device profile 212 is identified, then, in step 410, the computing device 102 may identify (e.g., via communication with the external device 106 or second application program associated therewith) the current state of the external device 106. The state of the external device 106 may include the current control options, settings, or other data associated with the external device 106. In step 412, the display device 240 of the computing device 102 may display options for controlling the external device 106 related to the identified device profile 212, where the options may be based on data stored in the device profile 212. For instance, the device profile 212 may directly store the device control options, or may store data for use by the primary application program of the computing device 102 to communicate with a secondary application program associated with the external device 106 to obtain device control options therefrom. In some embodiments, the device control options may be displayed concurrent with the live rendering of the physical environment 104. In other embodiments, the device control options may be overlaid on the live rendering, such as directly on top of the detected registered image. In some cases, the overlay may be a virtual representation of the external device 106 or an interface thereof.

In step 414, the input device 244 of the computing device 102 may receive input from the user selecting one or more device control options for the external device 106. Input may be received from the user via any suitable method, such as through voice, gestures directly on or viewable by the computing device 102, preset movements of the computing device 102, direct entry (e.g., typing) in the computing device 102, or a combination thereof. In step 416, the communications interface 204 of the computing device 102 may electronically transmit the selected device control options to the external device 106 via a communication channel 108 associated therewith established between the computing device 102 and the external device 106, either directly or indirectly (e.g., via the Internet or one or more other suitable communication networks). In some embodiments, the computing device 102 may be configured to provide recommendations for device control options to the user. In such an embodiment, the recommendations may be based on past selections by the user, user preferences, artificial intelligence, selected options by other users of the same device or type of device, etc. In step 418, the external device 106 may receive the selected device control options then, in step 420, adjust operation of the device based on the user selections. As a result, the external device 106 may be remotely controlled by the user as initiated via the viewing of a registered image via the computing device 102 using the augmented reality interface of the primary application program thereof.

Exemplary Method for Remotely Controlling an External Device

Figure 5:
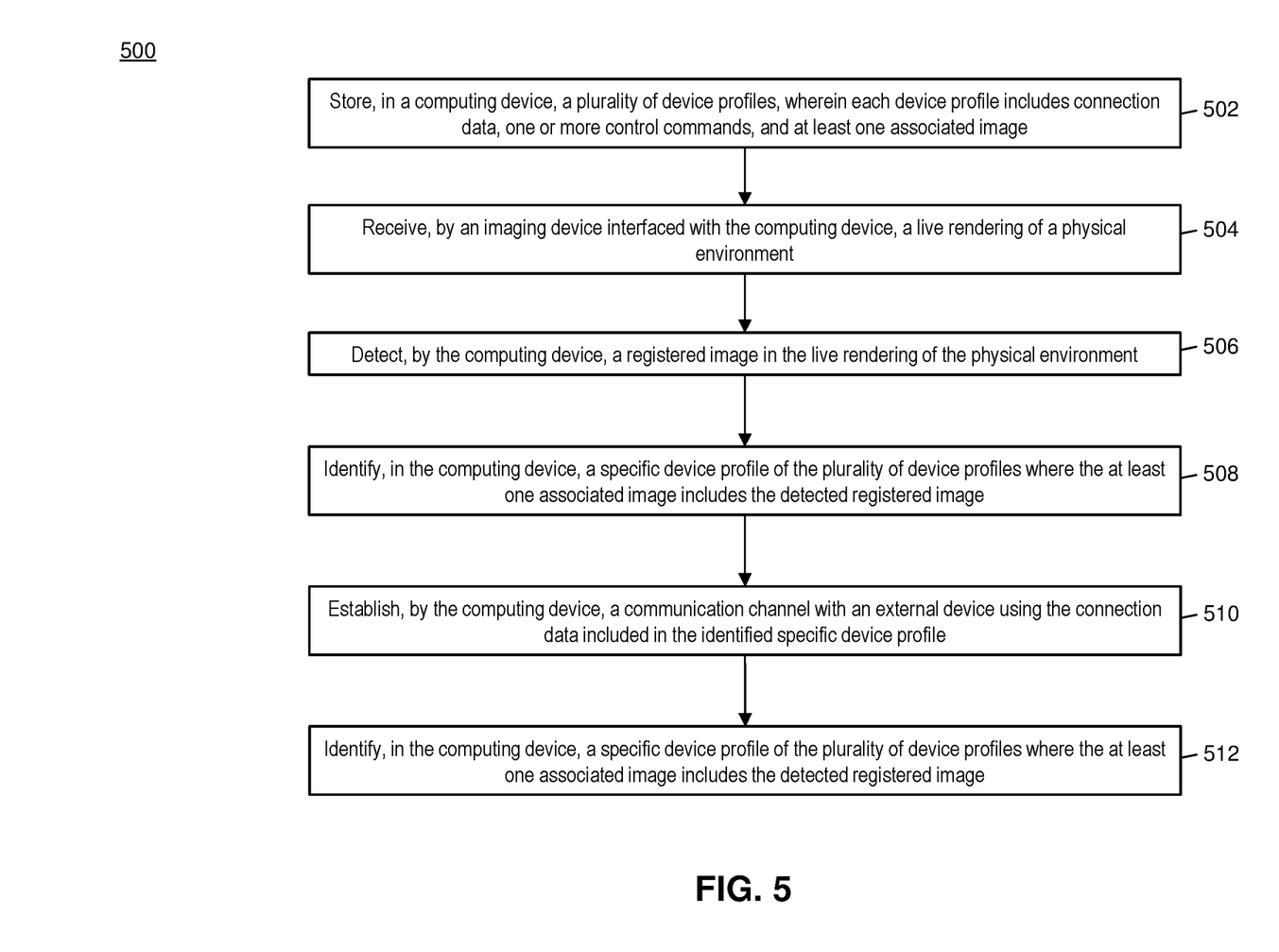
FIG. 5 is a flow chart illustrating an exemplary method for remotely controlling an external device in accordance with exemplary embodiments.

FIG. 5 illustrates a method 500 for the remote control of an external internet of things device by a computing device through the detection of an image associated therewith in a live rendering of a physical environment.

In step 502, a plurality of device profiles (e.g., device profiles 212) may be stored (e.g., in a device database 210) in a computing device (e.g., the computing device 102), wherein each device profile includes connection data, one or more control commands, and at least one associated image. In step 504, a live rendering of a physical environment (e.g., the physical environment 104) may be received by an imaging device (e.g., an input device 244) interfaced with the computing device. In step 506, a registered image may be detected (e.g., by the detection module 224) by the computing device in the live rendering of the physical environment.

In step 508, a specific device profile of the plurality of device profiles may be identified (e.g., via a query executed by a querying module 222) in the computing device where the at least one associated image includes the detected registered image. In step 510, a communication channel (e.g., the communication channel 108) may be established by the computing device with an external device (e.g., an external device 106) using the connection data included in the identified specific device profile. In step 512, at least one of the one or more control commands included in the identified specific device profile may be electronically transmitted (e.g., via the communications interface 204) by the computing device to the external device using the established communication channel.

In one embodiment, the received live rendering of the physical environment may be displayed by a display device (e.g., the display device 240) interfaced with the computing device. In a further embodiment, the detected registered image may be indicated on the displayed live rendering of the physical environment. In an even further embodiment, the one or more control commands included in the identified specific device profile may be displayed, by the display device, as superimposed on the indicated detected registered image.

In some embodiments, the method 500 may further include receiving, by an input device (e.g., an input device 244) interfaced with the computing device, a user instruction associated with the at least one of the one or more control commands, wherein the user instruction is received prior to electronic transmission of the at least one of the one or more control commands to the external device. In one embodiment, the external device may be an internet-enabled computing device. In some embodiments, the live rendering of the physical environment may be a virtual representation of the physical environment based on stored three-dimensional spatial data.

Techniques consistent with the present disclosure provide, among other features, systems and methods for remote control of an external device via an augmented reality interface. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for remotely controlling an external device, comprising:
   storing a plurality of device profiles, wherein each device profile includes connection data, one or more control commands, and at least one associated image;
   receiving a live rendering of a physical environment, the live rendering including at least one registered image and at least one unregistered image;
   detecting the registered image in the live rendering of the physical environment;
   identifying a specific device profile of the plurality of device profiles where the at least one associated image includes the detected registered image;
   establishing a communication channel with the external device using the connection data included in the identified specific device profile;
   receiving, a user instruction associated with at least one of the one or more control commands included in the identified specific device profile,
   wherein the user instruction is one of a voice instruction and a gesture instruction; and
   after receiving the user instruction, transmitting to the external device, using the established communication channel, the at least one of the one or more control commands for controlling the external device,
   wherein the method further comprises selecting the at least one unregistered image in the live rendering for initiating a registration process, the registration process associating the at least one unregistered image with the external device by associating the at least one unregistered image with the specific device profile and the at least one associated image for the external device.

2. The method of claim 1, further comprising:
   displaying the received live rendering of the physical environment.

3. The method of claim 2, further comprising:
   indicating, on the displayed live rendering of the physical environment, the detected registered image.

4. The method of claim 3, further comprising:
   displaying the one or more control commands included in the identified specific device profile superimposed on the indicated detected registered image.

5. The method of claim 1, wherein the external device is an Internet-enabled computing device.

6. The method of claim 1, wherein the live rendering of the physical environment is a virtual representation of the physical environment based on stored three dimensional spatial data.

7. The method of claim 1, wherein the at least one unregistered image in the live rendering is an image of an object that is unrelated to the external device.

8. The method of claim 1, wherein registering process of the at least one unregistered image includes registering two or more images for controlling the external device.

9. A system for remotely controlling an external device, comprising:
   a device database configured to store a plurality of device profiles, wherein each device profile includes connection data, one or more control commands, and at least one associated image;
   an imaging device configured to receive a live rendering of a physical environment, the live rendering including at least one registered image and at least one unregistered image;
   a hardware controller programmed to operate as a detection module configured to detect the registered image in the live rendering of the physical environment;
   the hardware controller programmed to operate as a querying module configured to execute a query on the device database to identify a specific device profile of the plurality of device profiles where the at least one associated image includes the detected registered image;
   a communications interface configured to establish a communication channel with the external device using the connection data included in the identified specific device profile;
   an input interface configured to receive a user instruction associated with at least one of the one or more control commands included in the identified specific device profile, wherein the user instruction is one of a voice instruction and a gesture instruction; and
   a transmitting device configured to transmit, after receipt of the user instruction, the at least one of the one or more control commands included in the identified specific device profile to the external device using the established communication channel for controlling the external device,
   wherein the input interface is further configured to receive an instructions for selecting the at least one unregistered image in the live rendering for initiating a registration process, the registration process associating the at least one unregistered image with the external device by associating the at least one unregistered image with the specific device profile and the at least one associated image for the external device.

10. The system of claim 9, further comprising:
    a display device configured to display the received live rendering of the physical environment.

11. The system of claim 10, wherein the display device is further configured to indicate, on the displayed live rendering of the physical environment, the detected registered image.

12. The system of claim 11, wherein the display device is further configured to display the one or more control commands included in the identified specific device profile superimposed on the indicated detected registered image.

13. The system of claim 10, wherein the external device is an Internet-enabled computing device.

14. The system of claim 10, wherein the live rendering of the physical environment is a virtual representation of the physical environment based on stored three dimensional spatial data.

15. A non-transitory computer readable media having instructions operable to cause one or more processors to perform the operations comprising:
    storing a plurality of device profiles, wherein each device profile includes connection data, one or more control commands, and at least one associated image;
    receiving a live rendering of a physical environment, the live rendering including at least one registered image and at least one unregistered image;
    detecting the registered image in the live rendering of the physical environment;
    identifying a specific device profile of the plurality of device profiles where the at least one associated image includes the detected registered image;

establishing a communication channel with an external device using the connection data included in the identified specific device profile;

receiving a user instruction associated with at least one of the one or more control commands included in the identified specific device profile, wherein the user instruction is one of a voice instruction input and a gesture instruction; and after receiving the user instruction, electronically transmitting to the external device, using the established communication channel, the at least one of the one or more control commands for controlling the external device, wherein the non-transitory computer readable media causes the one more processors to be further execute the operation of selecting the at least one unregistered image in the live rendering for initiating a registration process, the registration process associating the at least one unregistered image with the external device by associating the at least one unregistered image with the specific device profile and the at least one associated image for the external device.

16. The non-transitory computer readable media of claim 15, being further configured to perform the operations comprising:

displaying the received live rendering of the physical environment.

17. The non-transitory computer readable media of claim 15, being further configured to perform the operations comprising:

indicating, on the displayed live rendering of the physical environment, the detected registered image.

18. The non-transitory computer readable media of claim 15, being further configured to perform the operations comprising:

displaying the one or more control commands included in the identified specific device profile superimposed on the indicated detected registered image.

19. The non-transitory computer readable media of claim 15, wherein the external device is an Internet-enabled computing device.

* * * * *